(12) United States Patent
Liu et al.

(10) Patent No.: US 12,408,208 B2
(45) Date of Patent: Sep. 2, 2025

(54) METHOD AND DEVICE FOR RANDOM ACCESS IN WIRELESS COMMUNICATION SYSTEM

(71) Applicant: ZTE Corporation, Shenzhen (CN)

(72) Inventors: Kun Liu, Shenzhen (CN); Bo Dai, Shenzhen (CN); Huiying Fang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 325 days.

(21) Appl. No.: 17/876,866

(22) Filed: Jul. 29, 2022

(65) Prior Publication Data

US 2022/0369388 A1    Nov. 17, 2022

Related U.S. Application Data

(63) Continuation of application No. PCT/CN2020/121222, filed on Oct. 15, 2020.

(51) Int. Cl.
*H04W 74/0833* (2024.01)
*H04L 1/08* (2006.01)
*H04W 24/10* (2009.01)

(52) U.S. Cl.
CPC ......... *H04W 74/0841* (2013.01); *H04L 1/08* (2013.01); *H04W 24/10* (2013.01); *H04W 74/0833* (2013.01)

(58) Field of Classification Search
None
See application file for complete search history.

(56) References Cited

U.S. PATENT DOCUMENTS

| | | | |
|---|---|---|---|
| 2019/0261407 A1* | 8/2019 | Irukulapati | H04W 72/23 |
| 2020/0053800 A1* | 2/2020 | Deng | H04W 24/08 |
| 2021/0051707 A1* | 2/2021 | Rastegardoost | H04W 74/006 |
| 2021/0058947 A1* | 2/2021 | Lin | H04W 72/04 |
| 2021/0058971 A1* | 2/2021 | MolavianJazi | H04L 5/0044 |
| 2021/0076384 A1* | 3/2021 | MolavianJazi | H04L 5/0094 |
| 2021/0195654 A1* | 6/2021 | Lei | H04W 74/002 |
| 2022/0117004 A1* | 4/2022 | Lee | H04W 74/0833 |
| 2022/0312498 A1* | 9/2022 | He | H04W 74/006 |

(Continued)

FOREIGN PATENT DOCUMENTS

| | | |
|---|---|---|
| CN | 109495222 | 3/2009 |
| WO | 2014/104758 | 7/2014 |

(Continued)

OTHER PUBLICATIONS

Japanese Notice of Reasons for Rejection issued Oct. 16, 2023 in corresponding Japanese Patent Application No. 2022-546018 with English translation.

(Continued)

*Primary Examiner* — Saumit Shah
(74) *Attorney, Agent, or Firm* — Crowell & Moring LLP

(57) ABSTRACT

This disclosure relates to method and device for random access. In one implementation, the method may include obtaining a plurality of random access channel resource sets. The method may further include selecting a first random access channel resource set from the plurality of random access channel resource sets. The method may further include transmitting a random access preamble on the first random access channel resource set.

16 Claims, 5 Drawing Sheets

(56) References Cited

U.S. PATENT DOCUMENTS

| | | | |
|---|---|---|---|
| 2023/0239929 A1* | 7/2023 | Lin | H04W 52/242 370/329 |
| 2023/0284131 A1* | 9/2023 | Höglund | H04W 48/12 370/329 |

FOREIGN PATENT DOCUMENTS

| | | |
|---|---|---|
| WO | 2014/116928 | 7/2014 |
| WO | 2016/086144 | 6/2016 |

OTHER PUBLICATIONS

Ericsson, "Support for Transmission in Preconfigured UL Resources in LTE-MTC" [online], 3GPP TSG-RAN WG1 Meeting #97 R1-1905957, May 4, 2019, [date of retrieval: Oct. 16, 2023], Internet URL:https://www.3gpp.org/ftp/tsg_ran/WG1_RL1/TSGR1_97/Docs/R1-1905957.zip.

3rd Generation Partnership Project; Technical Specification Group Radio Access Network; Evolved Universal Terrestrial Radio Access (E-UTRA); Physical layer procedures (Release 16) [online], 3GPP TS 36.213 V16.3.0 (Sep. 2020), Oct. 1, 2020, [date of retrieval: Oct. 16, 2023], Internet URL:https://www.3gpp.org/ftp/Specs/archive/36_series/36.213/36213-g30.zip.

Extended European Search Report issued Dec. 6, 2022 in corresponding European Patent Application No. 20957141.3.

Huawei et al: "Other aspects for reduced capability devices", 3GPP Draft; RI-2004612, 3rd Generation Partnership Project (3GPP), Mobile Competence Centre; 650, Route Des Lucioles; F-06921 Sophia-Antipolis Cedex; France, vol. RAN WGI, No. E-meeting; May 25, 2020-Jun. 5, 2020 May 16, 2020 (May 16, 2020), XP051886328.

Sony: "Coverage recovery and capacity impact of Redcap devices", 3GPP Draft; RI-2005581, 3rd Generation Partnership Project (3GPP), Mobile Competence Centre; 650, Route Des Lucioles; F-06921 Sophia-Antipolis Cedex; France, vol. RAN WGI, No. e-meeting; Aug. 17, 2020-Aug. 28, 2020 Aug. 7, 2020 (Aug. 7, 2020), XP051917561.

Huawei et al: "Identification and access restriction of REDCAP UE", 3GPP Draft; R2-2007345, 3rd Generation Partnership Project (3GPP), Mobile Competence Centre; 650, Route Des Lucioles; F-06921 Sophia-Antipolis Cedex; France, vol. RAN WG2, No. Online; Aug. 17, 2020-Aug. 28, 2020 Aug. 7, 2020 (Aug. 7, 2020), XP051912113.

International Search Report issued Jul. 15, 2021 in International (PCT) Application No. PCT/CN2020/121222.

Written Opinion of the International Searching Authority issued Jul. 15, 2021 in International (PCT) Application No. PCT/CN2020/121222.

Korean-language Office Action issued in Korean Application No. 10-2022-7025787 dated Mar. 7, 2025 with English translation (16 pages).

3GPP; "Evolved Universal Terrestrial Radio Access (E-UTRA); Physical layer procedures", Oct. 2020, 228 pages.

* cited by examiner

METHOD AND DEVICE FOR RANDOM ACCESS IN WIRELESS COMMUNICATION SYSTEM

This application is a continuation application of PCT International Application No. PCT/CN2020/121222, filed with the China National Intellectual Property Administration, PRC on Oct. 15, 2020, which is herein incorporated by reference in its entirety.

TECHNICAL FIELD

This disclosure is directed generally to wireless communications and particularly to random access in a wireless communication system.

BACKGROUND

In a wireless communication system such as 5G new radio (NR) system, a user equipment (UE) may initially access the NR system by completing a random access procedure. FIG. 1 illustrates an exemplary procedure of contention-based random access (CBRA) 100 in the NR system. The UE may attempt random access by transmitting a random access preamble, also referred to as Msg1, to a wireless access network node (WANN) of the NR system on a configured random access channel resource (110). The WANN may respond with a random access response message, also referred to as Msg2 (120). The scheduling information of the Msg2 may, for example, be indicated in a downlink control information (DCI) carried by the physical downlink control channel (PDCCH). Then, the UE may transmit a scheduled transmission message, also referred to as Msg3, to the WANN 204 (130). The scheduling information of Msg3 may be indicated by an uplink grant carried in the Msg2. The WANN may transmit a contention resolution message, also referred to as Msg4, to the UE (140). During the random access procedure, it is likely that multiple UEs could transmit Msg3 to the WANN on the same transmission resources. The contention resolution message may notify the UE whose Msg3 has been correctly received by the WANN. Upon determining that the Msg3 transmitted by the UE has been correctly received by the WANN, the UE may transmit a message on physical uplink control channel (PUSCH), also referred to as Msg5, to the WANN (150).

SUMMARY

This disclosure is directed to methods and device related to wireless communication, and more specifically, for performing random access in a wireless communication system.

In one embodiment, a method for random access by a user equipment is disclosed. The method may include obtaining a plurality of random access channel (RACH) resource sets. The method may further include selecting a first random access channel resource set from the plurality of random access channel resource sets. The method may further include transmitting a random access preamble on the first random access channel resource set.

In another embodiment, a device for wireless communication may include a memory storing instructions and a processing circuitry in communication with the memory. When the processing circuitry executes the instructions, the processing circuitry is configured to carry out the above method.

In another embodiment, a computer-readable medium comprising instructions which, when executed by a computer, cause the computer to carry out the above method.

The above and other aspects and their implementations are described in greater detail in the drawings, the descriptions, and the claims below.

DETAILED DESCRIPTION

The technology and examples of implementations and/or embodiments in this disclosure can be used to improve performance in wireless communication systems. The term "exemplary" is used to mean "an example of" and unless otherwise stated, does not imply an ideal or preferred example, implementation, or embodiment. Please note that the implementations may, however, be embodied in a variety of different forms and, therefore, the covered or claimed subject matter is intended to be construed as not being limited to any of the embodiments to be set forth below. Please also note that the implementations may be embodied as methods, devices, components, or systems. Accordingly, embodiments of this disclosure may, for example, take the form of hardware, software, firmware or any combination thereof.

Figure 1:
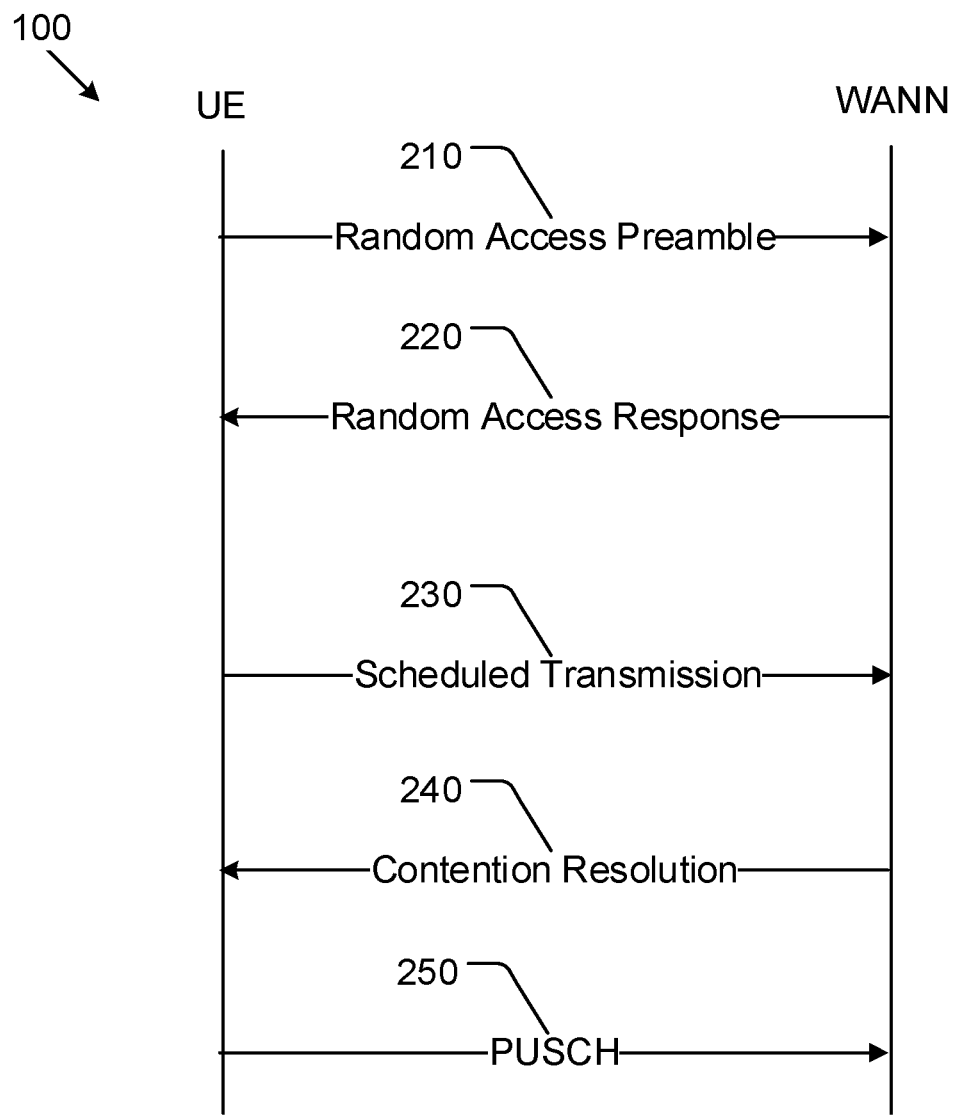
FIG. 1 illustrates an exemplary procedure of contention-based random access.
Figure 2:
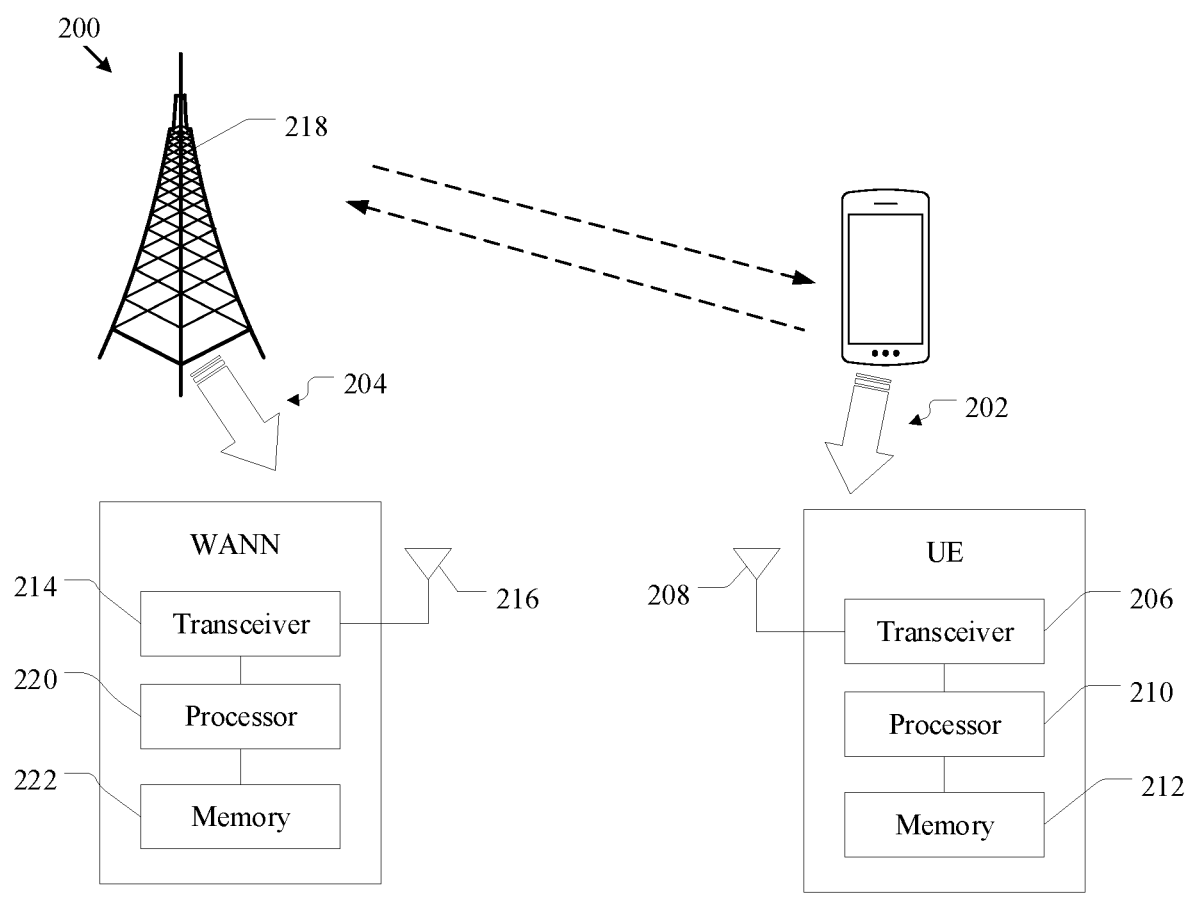
FIG. 2 illustrates an example diagram of a wireless communication network in accordance with various embodiments.

A wireless access network provides network connectivity between a user equipment and an information or data network such as a voice or video communication network, the Internet, and the like. An example wireless access network may be based on cellular technologies, which may further be based on, for example, 5G NR technologies and/or formats. FIG. 2 shows an example system diagram of wireless communication network 200 including a UE 202 as well as a wireless access network node (WANN) 204 according to various embodiments. The UE 202 may include but is not limited to a mobile phone, smartphone, tablet, laptop computer, a smart electronics, a wearable device, a video surveillance device, an industrial wireless sensors, or appliance including an air conditioner, a television, a refrigerator, an oven and the like, or other devices that are capable of communicating wirelessly over a network. Take the UE 202 as example, it may include transceiver circuitry 206 coupled to one or more antennas 208 to effect wireless communication with the wireless access network node 204. The transceiver circuitry 206 may also be coupled to a processor 210, which may also be coupled to a memory 212 or other storage devices. The memory 212 may store therein instructions or code that, when read and executed by the processor 210, cause the processor 210 to implement various ones of the methods described herein.

Similarly, the wireless access network node 204 may comprise a base station or other wireless network access points capable of communicating wirelessly over a network with one or more UEs. For example, the wireless access network node 204 may comprise a 5G NR base station, a 5G central-unit base station, or a 5G distributed-unit base station. Each type of these wireless access network nodes may be configured to perform a corresponding set of wireless network functions. The set of wireless network functions between different types of wireless access network nodes may not be identical. The set of wireless network functions between different types of wireless access network nodes, however, may functionally overlap. The wireless access network node 204 may include transceiver circuitry 214 coupled to one or more antennas 216, which may include an antenna tower 218 in various approaches, to effect wireless communication with the UE 202. The transceiver circuitry 214 may also be coupled to one or more processors 220, which may also be coupled to a memory 222 or other storage devices. The memory 222 may store therein instructions or code that, when read and executed by the processor 220, cause the processor 220 to implement various ones of the methods described herein.

For simplicity and clarity, only one WANN and one UE are shown in the wireless communication network 200. It will be appreciated that one or more WANNs may exist in the wireless communication network, and each WANN may serve one or more UEs in the meantime. Besides UEs and WANNs, the network 200 may further comprise any other network nodes with different functions such as the network nodes in core network of the wireless communication network 200. In addition, while various embodiments will be discussed in the context of the particular example wireless communication network 200, the underlying principle applies to other applicable wireless communication networks.

In a 5G NR system such as the network 200, the communication technique is dedicated to provide higher transmission rate, massive links, ultra-low latency, as well as higher transmission reliability. To the end, it puts forward a higher requirement for the functionality or capability of user equipments accessing to the NR system. For example, the UEs are equipped with more antennas and able to work within a wider bandwidth, which may be referred to as NR UE or full capability UE. In contrast, some UEs with simplified functionality such as wearable devices, video surveillance, and industrial wireless sensors may have fewer antennas and can only work within a narrower bandwidth, which may be referred to as reduced capability UE. Accordingly, the full capability UE may also be referred to as no reduced capability UE. The NR system is expected to serve both the full capability UEs and the reduced capability UEs.

Due to the narrower working bandwidth and fewer antennas, the uplink and downlink transmission performance of the reduced capability UE is worse than that of a full capability UE. The worse transmission/reception performance by the reduced capability UE may lead to the reduction of the maximum coverage radius of each transmission channel. As a result, the reduced capability UE is less likely to access to the NR system than the full capability UE under the mechanism of contention based random access. The techniques used to recover the maximum coverage radius of the transmission channel may be referred to as coverage recovery. One of the objectives of the present disclosure is to explore the coverage recovery technique to facilitate to increase the likelihood for the reduced capability UE to access the wireless communication network through the random access procedure.

Figure 3:
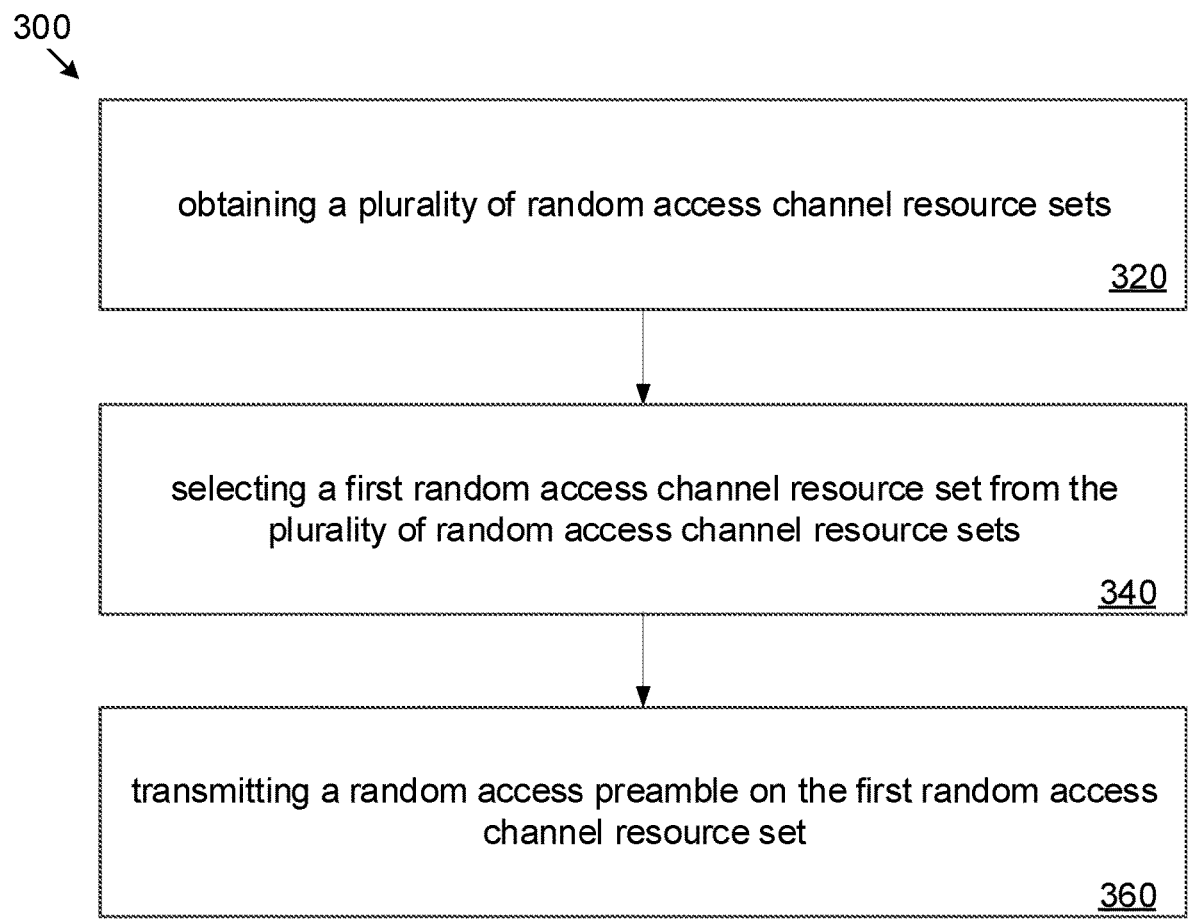
FIG. 3 illustrates a flow diagram of a method for random access in accordance with an embodiment.

FIG. 3 illustrates an exemplary implementation 300 for random access. The UE 202 may obtain a plurality of random access channel resource sets which may, for example, be physical random access channel (PRACH) resource sets (320). In an implementation, the plurality of access channel resource sets may be configured by the WANN 204, and then the WANN 204 may transmit the plurality of random access channel resource sets to the UE 202, for example, via a higher layer signaling. Alternatively or additionally, the plurality of random access channel resource sets may be preconfigured and stored in the memory 212 of the UE 202.

The UE 202 may select a first random access channel resource set from the plurality of random access channel resource sets (340). The plurality of random access channel resource sets may be used by both the full capability UE and the reduced capability UE to transmit the random access preamble in the random access procedure.

In an implementation, the UE 202 may select the first random access channel resource set based on the first coverage recovery level, which will be described with reference to FIG. 4. The UE 202 may obtain a first coverage recovery level from a plurality of coverage recovery levels (3410). The first coverage recovery level may, for example, indicate a transmission/reception capability of a user equipment between the user equipment and a wireless access network node.

The first coverage recovery level may be determined by the UE 202. The UE 202 may obtain a measurement result of a downlink reference signal received from the WANN 204. The downlink reference signal may, for example, be a synchronization signal/physical broadcast channel block (SSB). The measurement result may, for example, include reference signal received quality (RSRQ), reference signal received power (RSRP), or signal-to-noise and interference ratio (SINR). Then, the UE 202 may select the first coverage recovery level from a plurality of coverage recovery levels by comparing the measurement result with a measurement threshold.

The plurality of coverage recovery levels may indicate different transmission/reception capabilities of a user equipment between the user equipment and a wireless access network node. For example, the coverage recover levels may include Level 0 and Level 1. Level 0 may indicate that the user equipment has a relatively strong transmission/reception capability such that the coverage recovery function of the user equipment does have to be enabled. Level 1 may indicate that the user equipment has a relatively weak transmission/reception capability such that the coverage recovery function of the user equipment has to be enabled. Additionally, the coverage recovery levels may include one or more additional levels such as Level 2. The user equipment with Level 2 may have weaker transmission/reception capability than the user equipment with Level 1 such that the user equipment with Level 2 may require further coverage recovery function to be enabled.

The WANN 204 may configure measurement thresholds based on a type of the user equipment and transmit the measurement thresholds to the UE 202, for example, via higher layer signaling. The type of the user equipment may include, for example, a full capability UE and a reduced capability UE. For example, the WANN 204 may configure two measurement thresholds, TH0 and TH1, where TH0<TH1. The TH0 may be configured for the reduced capability UE while the TH1 may be configured for the full capability UE. Where the measurement result of the downlink reference signal MR<=TH0, the UE 202 may determine that its coverage recovery level is Level 2. Where TH0<MR<=TH1, the UE 202 may determine that its coverage recovery level is Level 1. Where TH1<MR, the UE 202 may determine that its coverage recovery level is Level 0. It may indicate that the UE with Level 0 has a stronger transmission/reception capability than the UE with Level 1, which has a stronger transmission/reception capability than the UE with Level 2.

Alternatively or additionally, the first coverage recovery level may be determined by the WANN 204. The WANN 204 may obtain a measurement result of a uplink reference signal, such as a random access preamble received from the UE 202. The measurement result may, for example, be RSRQ, RSRP, or SINR. Then, the WANN 204 may select the first coverage recovery level from a plurality of coverage recovery levels by comparing the measurement result with the measurement threshold in a similar way as done by the UE 202 discussed above.

Subsequent to selecting the first coverage recovery level, the WANN 204 may notify the UE 202 of the first coverage recovery level by transmitting a downlink control information in a transmission resource corresponding to the first coverage recovery level. The transmission resource may, for example, include at least one of a physical downlink control channel (PDCCH), a PDCCH search space, or a control resource set (CORESET). A CORESET may include one or more PDCCH search spaces. A PDCCH search space may include one or more PDCCHs.

In an example, the WANN 204 may configure a plurality of PDCCH search spaces for each of the plurality of coverage recovery levels respectively. The WANN 204 may select a PDCCH search space corresponding to the first coverage recovery level from the plurality of PDCCH search spaces and transmit the downlink control information in the selected PDCCH search space to the UE 202. On the UE 102 side, the UE 202 may detect for the downlink control information and determine the coverage recovery level corresponding to the PDCCH search space within which the downlink control information is detected as the first coverage recovery level.

Alternatively or additionally, the WANN 204 may configure a plurality of PDCCHs within a single PDCCH search space respectively for each of the plurality of coverage recovery levels. The plurality of PDCCHs may have different aggregation levels. In other words, each of the plurality of coverage recovery levels is mapping to a different aggregation level. The higher the aggregation level of the PDCCH is, the larger the size of the time-frequency resources occupied by the PDCCH is. The WANN 204 my select a PDCCH from a plurality of PDCCHs within the single PDCCH search space and transmit the downlink control information in the selected PDCCH. The UE 202 may detect for the downlink control information within the single PDCCH search space and determining a coverage recovery level corresponding to an aggregation level of a PDCCH within which the downlink control information is detected as the first coverage recovery level.

Alternatively or additionally, the WANN 204 may configure different number of repetitive CORSETs for each of the plurality of coverage recovery levels. As such, the WANN 204 may determine a number of repetitive CORSETs in time domain based on the coverage recovery level and transmit the downlink control information via the number of repetitive control resource sets. On the UE 202 side, the UE 202 may determine the number of repetitive CORSETs in time domain by which the UE 202 needs to combine information carried to obtain the downlink control information and determine the first coverage recovery level based on the number of repetitive control resource sets.

Figure 5:
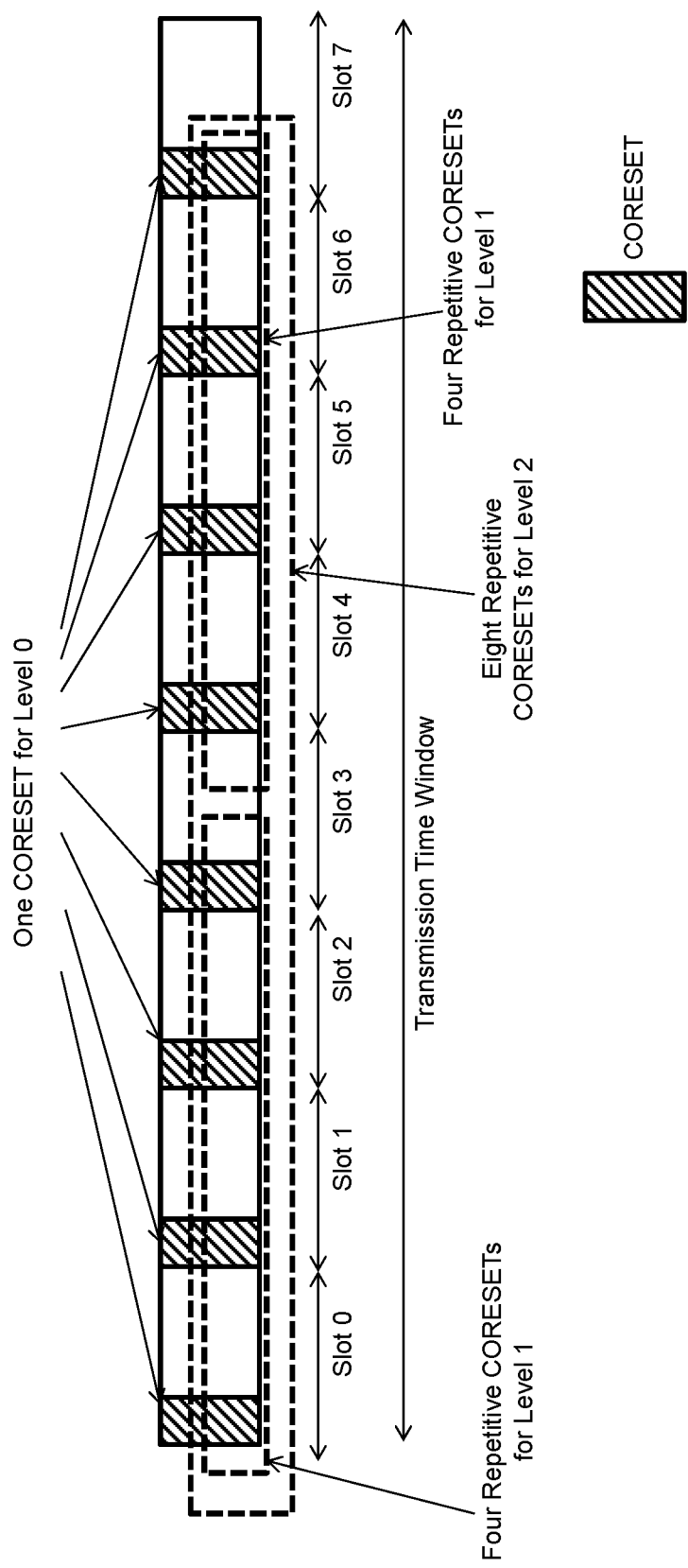
FIG. 5 illustrates repetitive control resource sets for different coverage recovery levels.

In an example as illustrated in FIG. 5, a transmission time window has eight slots, Slot 0 through Slot 7. Each slot may be configured with a CORESET for transmission in an occasion of the slot. The WANN 204 may configure the repetition number 1 for the coverage recovery level Level 0, the repetition number 4 for the coverage recovery level Level 1, and the repetition number 8 for the coverage recovery level Level 2. The WANN 204 may transmit the downlink control information on the eight CORESETs within the transmission time window. Where the UE 202 obtains the downlink control information by detecting one CORESET, the UE 202 may determine that the first coverage recovery level is Level 0. Where the UE 202 obtains the downlink control information by having to detect four repetitive CORESETs and combine detected information carried by the four repetitive CORESETs, the UE 202 may determine that the first coverage recovery level is Level 1. Where the UE 202 obtains the downlink control information by having to detect eight repetitive CORESETs and combine detected information carried by the eight repetitive CORESETs, the UE 202 may determine that the first coverage recovery level is Level 2.

It should be appreciated that the aggregation level of PDCCH, PDCCH search space, and the repetition number of CORESETs may also be used in combination to indicate the coverage level. For example, as shown in Table 1, a combination of the aggregation level and the repetition number of the CORESETs may be used to determine the individual coverage recovery level.

TABLE 1

| Coverage Recovery Level Indication | | |
|---|---|---|
| Coverage Recovery Level | Aggregation Level | Repetition Number |
| Level 0 | 1, 2, 4, 8 or 16 | 1 |
| Level 1 | 4, 8 or 16 | 4 |
| Level 2 | 4, 8 or 16 | 8 |

Figure 4:
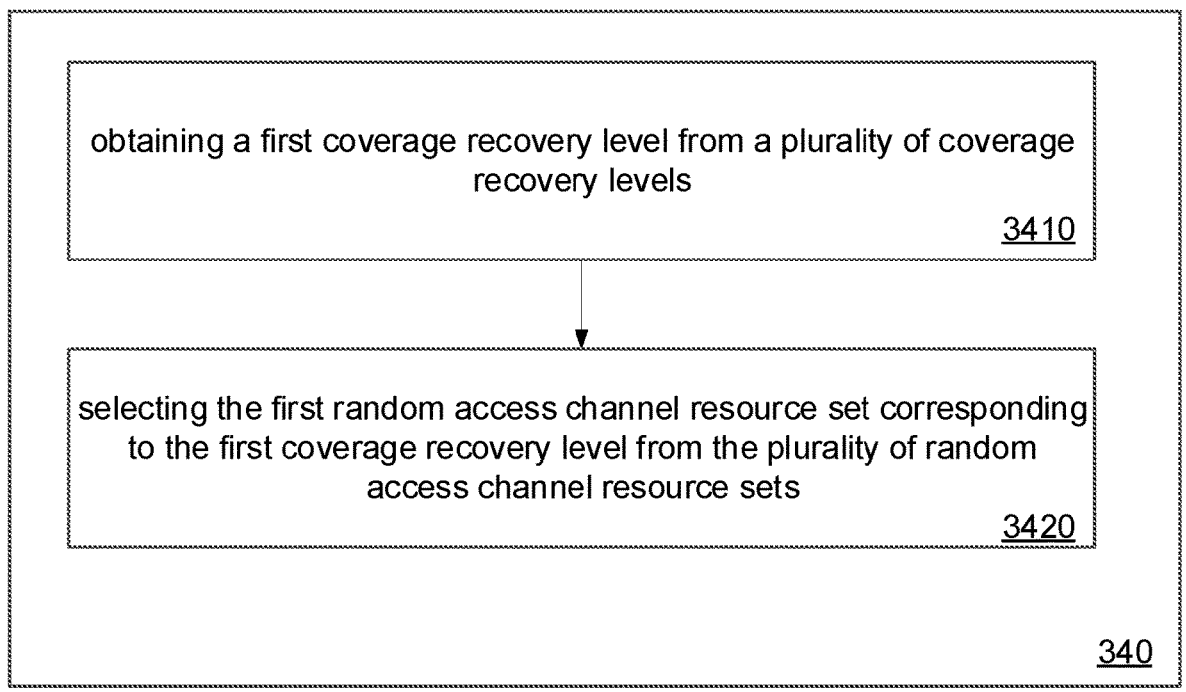
FIG. 4 illustrates a flow diagram of a method for random access in accordance with an embodiment.

Referring to FIG. 4, after obtaining the first coverage recovery level, the UE 202 may select the first random access channel resource set corresponding to the first coverage recovery level from the plurality of random access channel resource sets (3420). The WANN 204 may configure the plurality of random access channel resource sets for each of the plurality of coverage recovery levels respectively and transmit the configuration of the random access channel resource sets to the UE 202, for example, via higher layer signaling. Alternatively or additionally, the plurality of random access channel resource sets may be preconfigured for each of the coverage recovery levels and stored in the UE 202 locally. The random access channel resource sets may be configured with overlapping random access channel resource.

In another implementation, the UE 202 may select the first random access channel resource set from the plurality of random access channel resource sets based on a feature information of the UE 202. The feature information may include, for example, a type of the user equipment, whether the user equipment to enable coverage enhancement, a level of the coverage enhancement for the user equipment, whether the user equipment to enable coverage recovery, and a level of the coverage recovery for the user equipment. Here, the coverage enhancement may refer to the technique extending the maximum coverage radius of a transmission channel. The type of the user equipment may include, for example, a full capability UE and a reduced capability UE. Where the type of the UE 202 is a full capability user equipment, the UE 202 may obtain a first measurement result of a downlink reference signal received from the WANN 204 and determine whether to enable coverage enhancement by comparing the first measurement result with the first measurement threshold. Where the type of the UE 202 is a reduced capability user equipment, the UE 202 may obtain a second measurement result of a downlink reference signal received from the WANN 204 and determine whether to enable coverage enhancement and/or coverage recovery by comparing the second measurement result with the second measurement threshold. The first measurement result and the second measurement result may include, for example, RSRQ, RSRP, or SINR. The first measurement threshold and the second measurement threshold may be configured, for example, by the WANN 204.

The UE 202 may transmit the feature information to the WANN 204 after the random access procedure. Alternatively or additionally, the UE 202 may transmit the feature information to the WANN 204 during the random access procedure, for example, in Msg3 or Msg5.

In an example, according to the feature information of the UE 202, the UE 202 may be classified as one of the following classifications of user equipment: a full capability UE without enabling coverage enhancement, a full capability UE enabling coverage enhancement, a reduced capability UE without enabling coverage enhancement or coverage recovery, a reduced capability UE enabling coverage recovery, or a reduced capability UE enabling coverage enhancement and coverage recovery. Where the UE 202 is classified as, for example, a full capability UE enabling coverage enhancement and the feature information includes a specific level of coverage enhancement for the UE 202, the UE 202 may be further classified as a full capability UE enabling coverage enhancement with the specific level. Similarly, where the UE 202 is classified as, for example, a reduced capability UE enabling coverage recovery and the feature information includes a specific level of coverage recovery for the UE 202, the UE 202 may be further classified as a reduced capability UE enabling coverage recovery with specific level.

The UE 202 may be configured with a RACH resource set configuration option. The RACH resource set configuration option may include mapping information between the random access channel resource sets and classifications of user equipment. A random access channel resource set may map to one or more classifications of user equipment. Alternatively, the UE 202 may be configured with a plurality of RACH resource set configuration options. Each of the RACH resource set configuration options may include different mappings between the random access channel resource sets and classifications of user equipment. For example, the UE 202 may be configured with eight RACH resource set configuration options, option I through option VIII, as shown in Tables 2A-2H.

TABLE 2A

RACH Set Configuration Option I

| RACH Set | Classifications of User Equipment |
| --- | --- |
| Set 0 | Full capability UE without enabling coverage enhancement |
| Set 1 | Full capability UE enabling coverage enhancement |
| Set 2 | Reduced capability UE without enabling coverage enhancement or coverage recovery Reduced capability UE enabling coverage recovery |

TABLE 2A-continued

RACH Set Configuration Option I

| RACH Set | Classifications of User Equipment |
| --- | --- |
| | Reduced capability UE enabling coverage enhancement and coverage recovery |

TABLE 2B

RACH Set Configuration Option II

| RACH Set | Classifications of User Equipment |
| --- | --- |
| Set 0 | Full capability UE without enabling coverage enhancement Reduced capability UE without enabling coverage enhancement or coverage recovery |
| Set 1 | Full capability UE enabling coverage enhancement Reduced capability UE enabling coverage recovery |
| Set 2 | Reduced capability UE enabling coverage enhancement and coverage recovery |

TABLE 2C

RACH Set Configuration Option III

| RACH Set | Classifications of User Equipment |
| --- | --- |
| Set 0 | Full capability UE without enabling coverage enhancement Reduced capability UE without enabling coverage enhancement or coverage recovery |
| Set 1 | Full capability UE enabling coverage enhancement Reduced capability UE enabling coverage recovery Reduced capability UE enabling coverage enhancement and coverage recovery |

TABLE 2D

RACH Set Configuration Option IV

| RACH Set | Classifications of User Equipment |
| --- | --- |
| Set 0 | Full capability UE without enabling coverage enhancement Reduced capability UE without enabling coverage enhancement or coverage recovery |
| Set 1 | Full capability UE enabling coverage enhancement |
| Set 2 | Reduced capability UE enabling coverage recovery |
| Set 3 | Reduced capability UE enabling coverage enhancement and coverage recovery |

TABLE 2E

RACH Set Configuration Option V

| RACH Set | Classifications of User Equipment |
| --- | --- |
| Set 0 | Full capability UE without enabling coverage enhancement |
| Set 1 | Full capability UE enabling coverage enhancement Reduced capability UE without enabling coverage enhancement or coverage recovery Reduced capability UE enabling coverage recovery Reduced capability UE enabling coverage enhancement and coverage recovery |

TABLE 2F

RACH Set Configuration Option VI

| RACH Set | Classifications of User Equipment |
|---|---|
| Set 0 | Full capability UE without enabling coverage enhancement |
| Set 1 | Full capability UE enabling coverage enhancement<br>Reduced capability UE without enabling coverage enhancement or coverage recovery<br>Reduced capability UE enabling coverage recovery |
| Set 2 | Reduced capability UE enabling coverage enhancement and coverage recovery |

TABLE 2G

RACH Set Configuration Option VII

| RACH Set | Classifications of User Equipment |
|---|---|
| Set 0 | Full capability UE without enabling coverage enhancement |
| Set 1 | Full capability UE enabling coverage enhancement |
| Set 2 | Reduced capability UE without enabling coverage enhancement or coverage recovery<br>Reduced capability UE enabling coverage recovery |
| Set 3 | Reduced capability UE enabling coverage enhancement and coverage recovery |

TABLE 2H

RACH Set Configuration Option VIII

| RACH Set | Classifications of User Equipment |
|---|---|
| Set 0 | Full capability UE without enabling coverage enhancement |
| Set 1 | Full capability UE enabling coverage enhancement<br>Reduced capability UE without enabling coverage enhancement or coverage recovery<br>Reduced capability UE enabling coverage recovery<br>Reduced capability UE enabling coverage enhancement and coverage recovery with coverage recovery Level 1 |
| Set 2 | Reduced capability UE enabling coverage enhancement and coverage recovery with coverage recovery Level 2 |

In this case, the UE 202 may select a target RACH resource set configuration option from the above RACH resource set configuration options. Then, the UE 202 may select the first random access channel resource set corresponding to the feature information of the UE 102 from the target RACH resource set configuration option. In an implementation, the UE 202 may select the target RACH resource set configuration option from the access channel resource set configuration options based on the indication information of the target RACH resource set configuration option. The indication information may include, for example, the number of RACH sets configured in the RACH resource set configuration option. For example, where the number of RACH sets in the indication information is two, the UE 202 may select one of the RACH set configuration option III and the RACH set configuration option V as the target RACH set configuration option. The indication information may be configured, for example, by the WANN 204. Further, as this example, it is likely that there two or more RACH set configuration options having the number of the RACH sets equal to the number set in the indication information. The WANN 204 may, for example, transmit an option indicator to the UE 202. The option indicator may indicate which one of the RACH set configuration option III and the RACH set configuration option V may be selected as the target RACH set configuration option.

Where the first random access channel resource set is mapped to a reduced capability UE without enabling coverage enhancement or coverage recovery, a reduced capability UE enabling coverage recovery, or a reduced capability UE enabling coverage enhancement and coverage recovery, it means that the first random access channel resource set may be used by a reduced capability UE. In this case, a uplink bandwidth part corresponding to the first random access channel resource set may be configured, for example by a WANN such as the WANN 204, to be within a working bandwidth of the reduced capability UE. As such, the reduced capability UE such as the UE 202 may transmit Msg3 on the uplink bandwidth part corresponding to the first random access channel resource set during the random access procedure.

In the case that the uplink bandwidth part corresponding to the first random access channel resource set is configured to exceed the working bandwidth of the UE 202. The UE 202 may have to use another random access channel resource set for random access. For example, the UE 202 may select a second random access channel resource set whose corresponding uplink bandwidth part is within the working bandwidth of the UE 202. In this way, the random access preamble, i.e., Msg1 may be transmitted on the second random access channel resource set and Msg3 may be transmitted on the uplink bandwidth part corresponding to the second random access channel resource set during the random access procedure.

Returning to FIG. 3, after selecting the first random access channel resource set, the UE 202 may perform a random access to the wireless communication network 200 by transmitting a random access preamble, i.e., Msg1 on the first random access channel resource set to the WANN 204 (360). In an implementation, to increase the likelihood for the UE 202 to successfully complete the random access procedure, the UE 202 may be configured to transmit the random access preamble for multiple times. The transmission times $N_{type}$ may, for example, be configured based on the type of the user equipment. For example, where the type of the user equipment is a full capability UE, the transmission time $N_{full\ capability}$ is m, m>1. Where the type of the user equipment is reduced capability UE, the transmission time $N_{reduced\ capability}$ is n, n>m. In this way, the UE 202 may attempt to perform the random access procedure up to $N_{type}$ times by starting to transmit the random access preamble until the UE 202 successfully completes the random access procedure.

Alternatively, the transmission times $N_{Level\ i}$ may, for example, be configured based on the coverage recovery level which may, for example, indicate a transmission/reception capability of the UE 202 between the UE 202 and the WANN 204. The weaker the transmission/reception capability of the UE 202 is, the more transmission times the UE 202 has. For example, transmission capability indicated by Level 2 is weaker than that indicated by Level 1, which is weaker than that indicated by Level 0. Thus, $N_{level\ 0} < N_{Level\ 1} < N_{Level\ 2}$ In this way, the UE 202 may attempt to perform the random access procedure up to $N_{Level\ i}$ times by starting to transmit the random access preamble until the UE 202 successfully completes the random access procedure. The Level i is the coverage recovery level of the UE 202.

Further, in the case that the UE 202 fails to complete the random access procedure after transmitting the random access preamble for $N_{level\ i}$ times, the UE 202 may perform a level ramping operation. The UE 202 may change its coverage recovery level from $N_{level\ i}$ to a next weaker level $N_{Level\ i+1}$. For example, the UE 202 may change its coverage recovery level from Level 0 to Level 1 or from Level 1 to Level 2. Then, the UE 202 may attempt to perform the random access procedure up to $N_{Level\ i+1}$ times by starting to transmit the random access preamble until the UE 202 successfully completes the random access procedure.

Due to the configuration of random access channel resource sets for UEs with different transmission/reception capability, the reduced capability UE may be provided more transmission resources and transmission opportunities so as to increase the likelihood for the reduced capability UE to successfully complete the random access procedure.

Optionally, to improve the transmission performance of Msg3, the UE 202 may repetitively transmit the Msg3 for multiple times. In an implementation, the UE 202 may determine whether to enable the repetition transmission of Msg3 based on a channel state information (CSI) request field in an uplink grant such as random access channel response (RAR) grant of a Msg2 message. Alternatively or additionally, the UE 202 may determine a repetition number of transmitting the Msg3 message based on a transmit power control (TPC) command for PUSCH field in the uplink grant of the Msg2 message. Aside from the CSI request field and the TPC command for PUSCH field, the RAR grant may include the following fields in Table 3. The transmission block size of the RAR grant is 27 bits.

TABLE 3

| RAR Grant Fields | |
|---|---|
| RAR Grant Field | Number of Bits |
| Frequency hopping flag | 1 |
| PUSCH frequency resource allocation | 14, for operation without shared spectrum channel access<br>12, for operation with shared spectrum channel access |
| PUSCH time resource allocation | 4 |
| MCS | 4 |
| TPC command for PUSCH | 3 |
| CSI request | 1 |
| ChannelAccess-CPext | 0, for operation without shared spectrum channel access<br>2, for operation with shared spectrum channel access |

Here, the value of the TPC command for PUSCH field may indicate a transmit power control value and a number of times of repetition transmission. Table 4A illustrates an exemplary mappings between the values of the TPC command for PUSCH field and the transmit power control value/the number of times of repetition transmission. As indicated in Table 4A, the repetition number may not increase until the transmit power control value reaches to the maximum value.

TABLE 4A

| TPC Command $\delta_{msg2,\ b,\ f,\ c}$ for PUSCH | | |
|---|---|---|
| TPC Command Value | Transmit Power Control Value (in dB) | Repetition Number |
| 0 | 0 | 1 |
| 1 | 3 | 1 |
| 2 | 6 | 1 |
| 3 | 9 | 1 |
| 4 | 9 | 2 |
| 5 | 9 | 4 |

TABLE 4A-continued

| TPC Command $\delta_{msg2,\ b,\ f,\ c}$ for PUSCH | | |
|---|---|---|
| TPC Command Value | Transmit Power Control Value (in dB) | Repetition Number |
| 6 | 9 | 8 |
| 7 | 9 | 16 |

Table 4B illustrates another exemplary mappings between the values of the TPC command for PUSCH field and the transmit power control value/the number of times of repetition transmission. In Table 4B, the repetition number may increase first and then the transmit power control value may increase when the repetition number reaches to a maximum value.

TABLE 4B

| TPC Command $\delta_{msg2,\ b,\ f,\ c}$ for PUSCH | | |
|---|---|---|
| TPC Command value | Transmit Power Control Value (in dB) | Repetition Number |
| 0 | 0 | 1 |
| 1 | 0 | 2 |
| 2 | 0 | 4 |
| 3 | 0 | 8 |
| 4 | 0 | 16 |
| 5 | 3 | 16 |
| 6 | 6 | 16 |
| 7 | 9 | 16 |

Table 4C illustrates a further exemplary mappings between the values of the TPC command for PUSCH field and the transmit power control value/the number of times of repetition transmission. In the case of Table 4C, the transmit power control value is set a constant high value, for example, 9. The repetition number may include 1, 2, 4, 8, and 16.

TABLE 4C

| TPC Command $\delta_{msg2,\ b,\ f,\ c}$ for PUSCH | |
|---|---|
| TPC Command value | Repetition Number |
| 0 | 1 |
| 1 | 2 |
| 2 | 4 |
| 3 | 8 |
| 4 | 16 |
| 5 | |
| 6 | |
| 7 | |

Table 4D illustrates a further exemplary mappings between the values of the TPC command for PUSCH field and the transmit power control value/the number of times of repetition transmission. In the Table 4D, the transmit power control value is set to a relatively high value, for example, 6 and 9. In the case that the transmit power control value is the same, the repetition number may increase gradually including 1, 2, 4, and 8.

TABLE 4D

TPC Command $\delta_{msg2, b, f, c}$ for PUSCH

| TPC Command Value | Transmit Power Control Value (in dB) | Repetition Number |
|---|---|---|
| 0 | 6 | 1 |
| 1 | 6 | 2 |
| 2 | 6 | 4 |
| 3 | 6 | 8 |
| 4 | 9 | 1 |
| 5 | 9 | 2 |
| 6 | 9 | 4 |
| 7 | 9 | 8 |

In an implementation, the UE 202 may configure the plurality of TPC command mapping tables such as Tables 4A-4D respectively for each of the plurality of random access channel resource sets. As such, the UE 202 may select, based on the first random access channel resource set, a target TPC command mapping table from the above TPC command mapping tables 4A-4D. For example, where the UE 202 selects the RACH resource set configuration option II as described in Table 2B as the target RACH resource set configuration option, the first random access channel resource set may be Set 0, Set 1, or Set 2. Where the first random access channel resource set is Set 0, it represents that the UE 202 is a full/reduced capability UE without enabling coverage recovery or coverage enhancement and thus does not necessarily need a higher transmit power. As such, the UE 202 may select one of the TPC command mapping Table 4A and Table 4B as the target TPC command mapping table because the Table 4A and Table 4B are configured with both lower and higher transmit power control values. In contrast, where the first random access channel resource set is Set 1 or Set 2, it represents that the UE 202 is a full/reduced capability UE enabling coverage recovery and/or coverage enhancement and thus necessarily needs a higher transmit power. As such, the UE 202 may select one of the TPC command mapping Table 4A and Table 4B as the target TPC command mapping table because the Table 4A and Table 4B are configured with only higher transmit power control values.

Various embodiments are discussed above to implement the UL inter-UE multiplexing in the shared spectrum. Multiple conditions are defined for the UE to determine whether it is able to share the transmission resources of other network devices such as UE and WANN. Where the defined conditions are satisfied, the UE may occupy the target transmission channel in a shared manner for its high priority uplink transmission, which increase the likelihood that the high priority uplink transmission may seize the target transmission channel. In this way, it alleviates the risk that, although the low priority uplink transmission is canceled, the high priority uplink transmission still cannot occupy the target transmission channel due to the failure to compete the transmission resource. As a result, the network system overall resource efficiency and the reliability of the transmission for high priority traffic can be guaranteed.

Throughout the specification and claims, terms may have nuanced meanings suggested or implied in context beyond an explicitly stated meaning. Likewise, the phrase "in one embodiment/implementation" as used herein does not necessarily refer to the same embodiment and the phrase "in another embodiment/implementation" as used herein does not necessarily refer to a different embodiment. It is intended, for example, that claimed subject matter includes combinations of example embodiments in whole or in part.

In general, terminology may be understood at least in part from usage in context. For example, terms, such as "and", "or", or "and/or," as used herein may include a variety of meanings that may depend at least in part on the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

The invention claimed is:

1. A method performed by a user equipment in a wireless communication network, comprising:
    obtaining a plurality of random access channel resource sets;
    obtaining a measurement result of a downlink reference signal received from a wireless access network node;
    selecting a first coverage recovery level from a plurality of coverage recovery levels by comparing the measurement result with a measurement threshold, the measurement threshold being configured based on a type of the user equipment, the type of the user equipment comprises a reduced capability user equipment and a full capability user equipment;
    selecting, based on the first coverage recovery level, a first random access channel resource set from the plurality of random access channel resource sets;
    transmitting a random access preamble on a random access channel resource in the first random access channel resource set; and
    selecting, based on the first random access channel resource set, a transmit power control (TPC) command mapping table from a plurality of TPC command mapping tables, the TPC command mapping table comprising mapping information between a value of the TPC command for physical uplink shared channel (PUSCH) field and a transmit power control value as well as a number of times of repetition transmission.

2. The method of claim 1, wherein the method further comprises:
attempting to perform a random access procedure by transmitting the random access preamble on the first random access channel resource set up to a first number of times corresponding to the first coverage recovery level, the first number of times being configured based on a type of the user equipment.

3. The method of claim 1, wherein the plurality of random access channel resource sets are respectively configured for each of the plurality of coverage recovery levels.

4. The method of claim 1, wherein selecting the first random access channel resource set comprises:
selecting, based on a feature information of the user equipment, the first random access channel resource set from the plurality of random access channel resource sets.

5. The method of claim 4, wherein the feature information of the user equipment comprises at least one of:
a type of the user equipment,
whether the user equipment enabling coverage enhancement,
a level of the coverage enhancement for the user equipment,
whether the user equipment enabling coverage recovery, or
a level of the coverage recovery for the user equipment.

6. The method of claim 5, wherein the method further comprises:
obtaining a target random access channel resource set configuration option; and
selecting the first random access channel resource set comprises:
selecting the first random access channel resource set corresponding to the feature information of the user equipment from the target random access channel resource set configuration option.

7. The method of claim 6, wherein obtaining the target random access channel resource set configuration option comprises:
obtaining indication information of the target random access channel resource set configuration option; and
selecting, based on the indication information, the target random access channel resource set configuration option from a plurality of random access channel resource set configuration options.

8. The method of claim 7, wherein the indication information is configured by a wireless access network node and comprises a number of random access channel resource sets, and the method further comprises:
selecting, based on an option indicator, the target random access channel resource set configuration option from two or more random access channel resource set configuration options having a same number of random access channel resource sets with the indication information.

9. The method of claim 5, wherein in response to the first random access channel resource set mapping to a reduced capability user equipment without enabling coverage enhancement or coverage recovery, a reduced capability user equipment enabling coverage recovery, or a reduced capability user equipment enabling coverage enhancement and coverage recovery, an uplink bandwidth part corresponding to the first random access channel resource set is configured to be within a working bandwidth of the user equipment.

10. The method of claim 5, wherein the method further comprises:
in response to the user equipment is a reduced capability user equipment, a reduced capability user equipment using coverage recovery, or a reduced capability user equipment using coverage enhancement and coverage recovery and an uplink bandwidth part corresponding to first random access channel resource set exceeds a working bandwidth of the user equipment,
selecting a second random access channel resource set whose corresponding uplink bandwidth part is within the working bandwidth of the user equipment, and
transmitting the random access preamble on the second random access channel resource set.

11. The method of claim 5, wherein the method further comprises:
transmitting the feature information of the user equipment to a wireless access network node of the wireless communication network after a random access procedure or in a Msg3 message or a Msg5 message during the random access procedure.

12. The method of claim 5, wherein the method further comprises:
in response to the type of the user equipment being a full capability user equipment,
obtaining a first measurement result of a downlink reference signal received from a wireless access network node, and
determining whether to enable coverage enhancement by comparing the first measurement result with a first measurement threshold, the first measurement threshold being configured by a wireless access network node; or
in response to the type of the user equipment being a reduced capability user equipment,
obtaining a second measurement result of a downlink reference signal received from a wireless access network node, and
determining whether to enable coverage enhancement or coverage recovery by comparing the second measurement result with a second measurement threshold, the second measurement threshold being configured by a wireless access network node.

13. The method of claim 1, wherein the method further comprises:
determining a repetition number of transmitting a Msg3 message based on a TPC command for PUSCH field in an uplink grant of a Msg2 message.

14. The method of claim 13, wherein the method further comprises:
determining whether to enable repetitive transmission of the Msg3 message based on a channel state information request field in a uplink grant of a Msg2 message.

15. A device comprising
a memory operable to store computer-readable instructions; and
a processor circuitry operable to read the computer-readable instructions, the processor circuitry when executing the computer-readable instructions is configured to:
obtain a plurality of random access channel resource sets;
obtain a measurement result of a downlink reference signal received from a wireless access network node;

select a first coverage recovery level from a plurality of coverage recovery levels by comparing the measurement result with a measurement threshold, the measurement threshold being configured based on a type of the user equipment, the type of the user equipment comprises a reduced capability user equipment and a full capability user equipment;

select, based on the first coverage recovery level, a first random access channel resource set from the plurality of random access channel resource sets;

transmit a random access preamble on a random access channel resource in the first random access channel resource set; and select, based on the first random access channel resource set, a transmit power control (TPC) command mapping table from a plurality of TPC command mapping tables, the TPC command mapping table comprising mapping information between a value of the TPC command for physical uplink shared channel (PUSCH) field and a transmit power control value as well as a number of times of repetition transmission.

16. A non-transitory computer-readable media, having instructions stored on the computer-readable media, the instructions configured to, when executed, cause a computer to:

obtain a plurality of random access channel resource sets;

obtain a measurement result of a downlink reference signal received from a wireless access network node;

select a first coverage recovery level from a plurality of coverage recovery levels by comparing the measurement result with a measurement threshold, the measurement threshold being configured based on a type of the user equipment, the type of the user equipment comprises a reduced capability user equipment and a full capability user equipment;

select, based on the first coverage recovery level, a first random access channel resource set from the plurality of random access channel resource sets;

transmit a random access preamble on a random access channel resource in the first random access channel resource set; and select, based on the first random access channel resource set, a transmit power control (TPC) command mapping table from a plurality of TPC command mapping tables, the TPC command mapping table comprising mapping information between a value of the TPC command for physical uplink shared channel (PUSCH) field and a transmit power control value as well as a number of times of repetition transmission.

* * * * *